United States Patent
Dasgupta et al.

(10) Patent No.: US 9,232,251 B2
(45) Date of Patent: Jan. 5, 2016

(54) PERSONALIZED CONTENT RECOMMENDATION

(71) Applicant: TATA CONSULTANCY SERVICES LIMITED, Mumbai, Maharashtra (IN)

(72) Inventors: Punyabrota Dasgupta, Maharashtra (IN); Sanjeev Kumar Goyal, Maharashtra (IN); Kamal Bhadada, Burbank, CA (US); Surajit Ramranjan Chakravorty, Maharashtra (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 13/946,180

(22) Filed: Jul. 19, 2013

(65) Prior Publication Data

US 2014/0298386 A1 Oct. 2, 2014

(30) Foreign Application Priority Data

Mar. 28, 2013 (IN) .......................... 1232/MUM/2013

(51) Int. Cl.
| | |
|---|---|
| H04N 21/25 | (2011.01) |
| H04N 21/258 | (2011.01) |
| H04N 21/45 | (2011.01) |
| H04N 21/6332 | (2011.01) |
| H04N 21/6543 | (2011.01) |

(52) U.S. Cl.
CPC ....... H04N 21/25891 (2013.01); H04N 21/251 (2013.01); H04N 21/4532 (2013.01); H04N 21/6332 (2013.01); H04N 21/6543 (2013.01)

(58) Field of Classification Search
CPC ... H04N 21/4521; H04N 21/84; H04N 21/45; H04N 21/251; H94N 21/84
USPC ........................................................ 725/45, 46
See application file for complete search history.

(56) References Cited

U.S. PATENT DOCUMENTS

| | | | | |
|---|---|---|---|---|
| 8,732,737 | B1 * | 5/2014 | Kalmes et al. .................. | 725/14 |
| 8,752,086 | B2 * | 6/2014 | Conant ............................ | 725/34 |
| 2002/0042923 | A1 * | 4/2002 | Asmussen et al. .............. | 725/92 |
| 2002/0059094 | A1 * | 5/2002 | Hosea et al. .................... | 705/10 |
| 2002/0104087 | A1 * | 8/2002 | Schaffer et al. ................. | 725/46 |
| 2004/0073918 | A1 * | 4/2004 | Ferman et al. .................. | 725/34 |
| 2008/0086456 | A1 * | 4/2008 | Rasanen et al. ................. | 707/3 |
| 2009/0178081 | A1 * | 7/2009 | Goldenberg et al. ........... | 725/46 |

* cited by examiner

*Primary Examiner* — Benjamin R Bruckart
*Assistant Examiner* — Tien M Nguyen
(74) *Attorney, Agent, or Firm* — Schwegman Lundberg & Woessner, P.A.

(57) ABSTRACT

Systems and methods for providing personalized content recommendation and content availability to a user are described. In one implementation, the described methods are implemented in the systems, where the method includes gathering content metadata based on user specific parameters, where the content metadata is content specific. The method also includes determining a primary content metadata from the gathered content metadata based and activity parameters. Further, the method includes rating the primary content metadata based on content rating parameter. Content availability information for the content associated with a secondary content metadata is also ascertained. The method moreover also includes providing the secondary content metadata with the content availability information to the user.

9 Claims, 4 Drawing Sheets

PERSONALIZED CONTENT RECOMMENDATION

TECHNICAL FIELD

The present subject matter relates, in general, to a method for content recommendation and in particular, to a method for recommending personalized content.

BACKGROUND

Advances in electronic communication technologies have facilitated widespread distribution of media content. Personal computers, handheld devices, mobile phones, set-top box devices, and other media content access devices are increasingly being used to access, store, download, share, and/or process various types of media content, such as video, audio, photographs, and/or multimedia. The advent of computer technology and entertainment until now has continued to provide new media content and selection options for consumers.

With the development of compact and portable mobile devices, users are able to access multimedia content such as music and movie on personal mobile devices, anytime and anywhere. On the go, availability of content has allowed users to view content of their interests in a short span of time and in ways never possible using traditional broadcasting and reception techniques. When the technology is used effectively, the user experience is smooth and leads to user satisfaction.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods, in accordance with embodiments of the present subject matter, are now described by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to systems and methods for providing personalized content recommendation and content availability information. The systems which may implement the described methods may include systems capable of providing information to users, like, but not limited to, desktop computers, hand-held devices, laptops or other portable computers, mobile phones, and set-top boxes. Although the description herein is with reference to set top boxes and smart phones, the methods may be implemented in other devices and systems as well, albeit with a few variations, as will be understood by a person skilled in the art.

With advances in telecommunication technology, such as internet and direct to home (DTH), exchange of the information has evolved multifold. Users are able to order, download, and view multimedia contents, such as movies, audio-visual contents, pictures, etc. Also, with the growth of computer performances, personal computers can now store a large volume of information. In such environment, users wish to access their multimedia content on their personal device, anytime and anywhere. In the midst of such a vide variety of available content and content providers, the user is perplexed to decide as to which content to watch and from which source.

For example, television service providers provide a wide variety of channels to their users, such as scheduled channels and on-demand channels. These channels provide a large number of media content to the users at different time instances. More often than not, based on competitor's services and attempt to reach to more number of users, television service providers tend to provide option of more number of channels at lesser prices. Generally, the television service providers, while providing a large number of channels, also provide a listing of available content with respect to each channel. Such a listing may either be in the form of printed catalogues or, may be through a typical electronic program guide (EPG). Television service providers providing DTH services sometimes also provide video-on-demand (VOD) content listings through a separate and distinct interface for the benefit of users. Therefore, information of content available at each channel provided by television service providers is made available to the users. Similarly, content aggregators such as YouTube™ and Netflix® also provide a wide variety of content for consumers to rent, buy or view for free.

Hence, users today have various options of content providers providing different and varied contents through available modes of telecommunication. Although the availability of more content providers with increased content provides users with option of more choices or more number of channels, the users are left confused and puzzled with questions such as, what to watch, when to watch, and where to watch.

For instance, when a user wishes to view a content of his choice, the user may have to search for the content on various platforms. If the user wishes to watch a movie 'XYZ', the user may browse for availability of the movie 'XYZ' on websites, at nearby theatres; in various catalogues of television channels; comments and suggestions about the movie in various blogs, posters, video clippings and the like. Therefore, it is more of a cumbersome, difficult and time consuming task for the users to identify a channel, a content provider or a location where the content of their interest is available.

According to an implementation of present subject matter, systems and methods for providing personalized content recommendation and content availability, is described herein. On one hand, the described methods may provide recommendation of contents based on personal preference of users and tailored to their interests; on the other hand, the methods may also provide information of such content's availability at various platforms. In other words, the described methods provide with specific and relevant information related to any content available for the users to utilize. In said implementation, the personalized content may include movies, television programs, theater performances, music concerts, sports matches, stand-up performances, or any other audio-visual content.

In an implementation, available content for users may be filtered based on their interests and later provided to the users for viewing. The user may view the content of interest on any personalized device, such as a television, a smart TV, a digital storage device, a digital media adapter (DMA), a BLU-RAY player, a BLU-RAY recorder, a personal computer (PC), a laptop computer, a tablet computer, a personal computer television (PC/TV), a personal digital assistant (PDA), a mobile telephone, a portable video player, a Smartphone, an iPad® or any other computing equipment, or wireless device, and/or combination thereof.

In an implementation of the present subject matter, to provide personalized content recommendation and content availability information, content metadata is gathered based on certain user specific parameters. The user specific parameters may include, but not limited to, demographic data, psychographic data and interests of other users in the user's geographical location. The demographic data may include data from a behavior graph of the people in the location, the people's interests, their likes and dislikes The gathered content metadata may be stored in a repository. These content metadata are more content specific rather than source specific. The content metadata may be gathered as source specific and later may be converted to a content specific metadata. For example, if users in a geographical location have viewed details regarding a recently released movie, content metadata of the movie may be gathered based on number of people who have viewed the movie, likes and dislikes made by the other users, rating for the movie by the other users, etc. The gathered content metadata of the movie may be specific to a source at which the movie is available. Such content metadata may be considered as source specific. Further, availability of the movie at various sources, description of the movie, its posters, stills of the movie and the like, may be gathered, and they may be regarded as content specific metadata.

In an implementation of the present subject matter, to provide personalized recommendation of content to users, a primary content metadata is determined from amongst the gathered content metadata, based on a set of activity parameters. The activity parameters include factors, such as historical viewing data of the user; comments, suggestions, blogs, likes, dislikes and ratings for content from user's friends; and data related to user viewed content on secondary sources, such as, websites relating to booking a movie ticket or relating to events happening in the geographical location.

In said implementation, initially the primary content metadata may be gathered based on the historical viewing data of the user. The historical viewing data may include, contents viewed or browsed by the user in his previous activities. Each activity may signify a level of interest associated with the contents and may be measured. For example, the user may click on a content of his interest and such activity may be regarded as casual activity. Further, the user may view more details associated with the content of his interest and may choose to rent the content. This activity may be regarded as genuine activity. The genuine activity indicates the affinity that the user has for the content. The content associated with the casual activity and genuine activity may comprise movies and television shows. Thus, for example in relation to movies and television shows, the primary content metadata gathered based on the historical viewing data of the user may include, content metadata associated with celebrities and genre based on the movies and television shows.

However, the primary content metadata may also be gathered based on suggestions from friends and user's viewing content at secondary sources. User's friend list from the user's social networking page may be collected and activity data of each friend may be obtained and measured. The activity data may indicate viewing patterns associated with the content and may be measured based on celebrity and genre which map to those celebrity and genre as in the historical viewing data of the user. For example, if a friend views a content associated with a particular celebrity and genre and if this content maps to a content which is viewed by the user also, then such a content may be scored as '1'. The scoring may be increased based on the number of friends who have viewed the content. Further, the user may view multiple other contents, such as quiz contests, adventurous shows, video songs, news related to a sport and a recipe, on other sources like YouTube™ and Netflix®. The user may also express his interest on his social networking page.

Hence, in operation, a first set of content metadata may be identified based on the historical viewing data. The first set may include content metadata gathered individually for the content associated with historical view of users, such as the celebrity and the genre. A second set of content metadata may be gathered based on likes, dislikes and rating by the user's friends, associated with other celebrities, other genres or based on content viewed by the friends where the content is associated with the same interest of the user Further, a third set of content metadata form viewing data of the user at secondary sources like YouTube™, Netflix®, etc., respectively, may be also be gathered.

In one implementation of the present subject matter, in order to determine the primary content metadata, a combination of the three sets of content metadata, the first set, the second set, and the third set; and corresponding scoring of the content metadata may be considered. In an implementation, the contents of the first set and the third set may be combined. This combination essentially includes content associated with user's interest either viewed at one platform, or at multiple other platforms. It will be appreciated that the determining of primary content metadata may include combination of any two sets among the three sets or a union of the three sets, in order to result in content metadata aligned to the likes, preferences and interests of the user.

Further, the primary content metadata may be rated or scored based on a content rating parameter. The content rating parameter may include, but not limited to, ratings of the content from various third party source, ratings provided to the content by user's friends, and a frequency with which the content is accessed by other users. For example, if the primary content metadata describes a movie 'ABC', the movie may be further rated based on content rating parameters. In such a situation, if the movie 'ABC' is previously viewed by three of user's friends, then the primary content metadata for the movie may be scored as '3'. Further, if there is a rating of 3.5 that has been provided to the movie, by a movie rating agency, the rating of 3.5 and 3 may be commonly considered to rate the movie 'ABC' for the user. Similarly, other platforms and their ratings may also be considered prior to generating a final rating score for the movie. In one implementation, the scoring may also consider, rating provided by the user's friends, their likes and dislikes.

The third party source may include web sites and private portals which consist of content availability information and ratings of various contents. It would be understood by those skilled in the art that, in order to rate the primary content metadata, ratings may be obtained from various possible sources, for effective rating.

In another implementation of the present subject matter, a secondary content metadata may be determined based on the rated primary content metadata. The secondary content metadata may include highest rated primary content metadata or primary content metadata which have got a score above a pre-determined threshold.

Further, in one implementation, the content availability information for content associated with the secondary content metadata may be obtained. The content availability information may be obtained during the initial gathering of content metadata or after the rating of primary content metadata. Finally, the secondary content metadata with the content availability information may be recommended to the user. The recommendation may also be provided in a unified view which may include various other details about the content, such as rating provided by the friends, overall rating, number of likes and dislikes indicated by 'thumbs up' or 'thumbs down' icons and comments related to the content.

In another implementation, the user may enter his choice of interest and content gathering may be performed based on the choice of interest. Since the user indicates his choice, the content gathering may be more deterministic. Personalized content recommendation in such cases also may include content availability information and content ratings.

System(s) implementing the disclosed method(s) include, but are not limited to, hand-held devices, multiprocessor system, microprocessor based programmable consumer electronics, laptops, network computers, minicomputers, mainframe computers, and the like. Although the present subject matter recites the word 'movies' to illustrate the 'content', the subject matter does not intent to limit the content to movies. It will be appreciated by a person skilled in the art that content may also include any visuals or audio-video content such as, television programs, advertisements, etc.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action.

While aspects of described system(s) and method(s) of personalized content recommendation system can be implemented in any number of different computing systems, environments, and/or configurations, the implementations are described in the context of the following exemplary system(s) and method(s).

Figure 1:
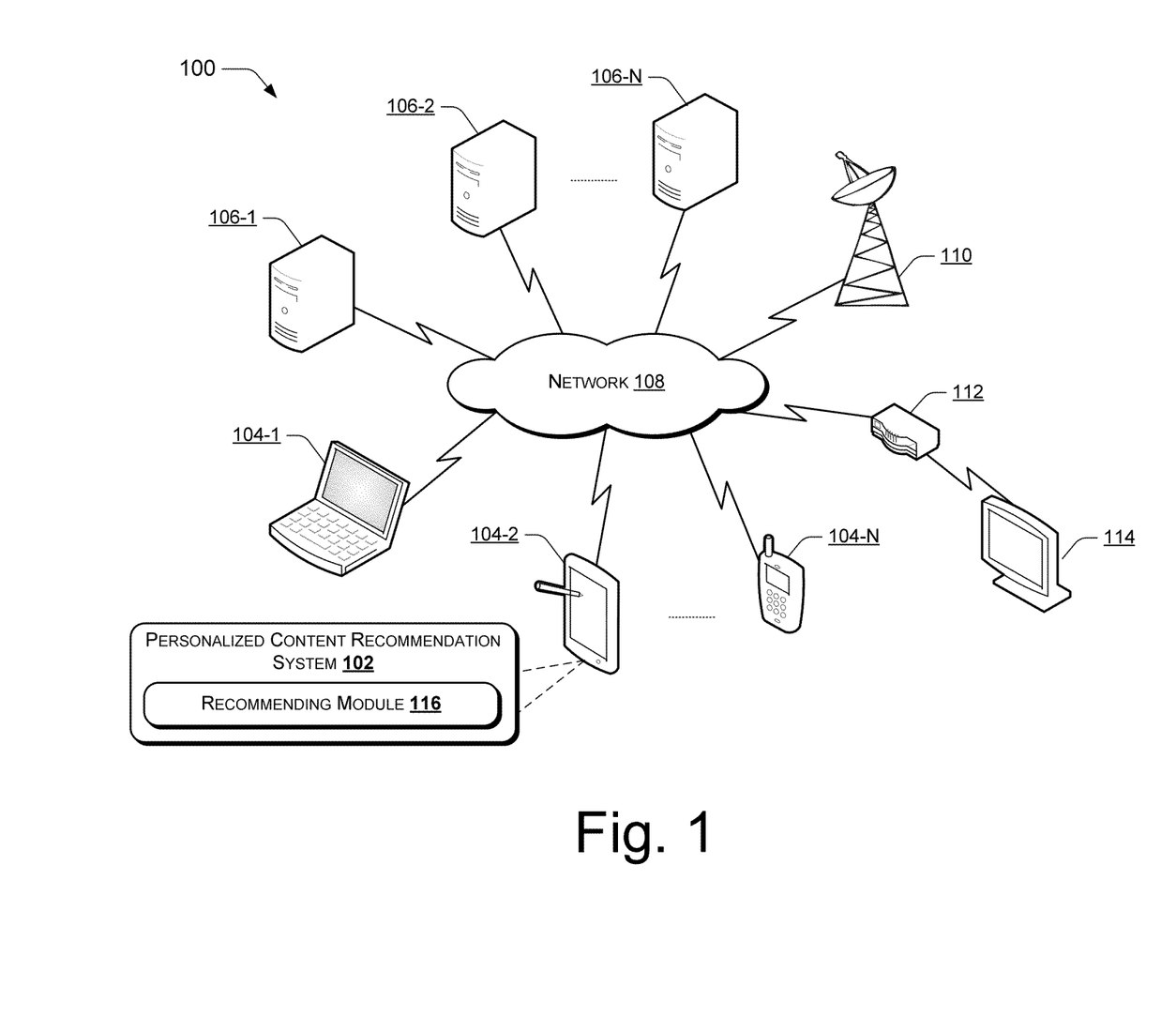
FIG. 1 illustrates a network environment implementing a personalized content recommendation system, in accordance with an embodiment of the present subject matter.

FIG. 1 illustrates a network environment 100 implementing a personalized content recommendation system 102, hereinafter referred as system 102, in accordance with an embodiment of the present subject matter. In one implementation, the network environment 100 can be a public network environment, including various servers and computing devices. In another implementation, the network environment 100 can be a private network environment with a limited number of computing devices, such as personal computers, servers, laptops, and/or communication devices, such as mobile phones and smart phones.

The system 102 described herein, can be implemented in any network environment comprising a variety of network devices, including routers, bridges, servers, computing devices, storage devices, etc. In one implementation, the system 102 is implemented in one or more user devices 104-1, 104-2, ..., 104-N, individually and commonly referred to as user device(s) 104 hereinafter. The user devices 104 may include multiple applications that may be running to perform several functions, as required by different users and individual organizations. The system 102 can be implemented in a computing device, such as a laptop computer, a desktop computer, a notebook, a workstation, a mainframe computer, a server, and the like. The user devices 104 may be implemented as, but are not limited to, desktop computers, hand-held devices, laptops or other portable computers, tablet computers, mobile phones, PDAs, Smartphones, land-line phones, and the like. In one implementation, the user device 104 is communicatively connected to one or more potential sources 106-1, 106-2, ..., 106-N, individually and commonly referred to as source(s) 106 hereinafter, which are capable of providing content, through a network 108.

The network 108 may be a wireless or a wired network, or a combination thereof. The network 102 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 108 includes various network entities, such as gateways, routers; however, such details have been omitted for ease of understanding.

The source 106 includes, not limiting to, websites, private portals, information retrieval databases, and the like. Websites may include Facebook®, Twitter®, Orkut®, Picasa®, Hi5® and the like, which are capable for sharing media contents, text documents, pictures, blogs, videos and/or combinations thereof. Further, the user device 104 may also receive content from a telecommunication tower or a satellite communication tower 110, hereinafter referred to as tower 110.

In one implementation of the present subject matter, apart from the user device 104, a user may utilize a set-top box (STB) 112 connected to a display unit, such as the television (TV) 114 to avail available content. The user device 104 and the STB 112 may also be connected through wireless network 108 to facilitate easy transfer of data. The tower 110 and the STB 112 may be connected through wires and cables. In said implementation, the system 102 may also be implemented in the STB 112 and may include a recommendation module 116.

According to an implementation of the present subject matter, the system 102 is configured to gather content metadata from various sources, such as source 106 and tower 110. In said implementation, the gathering may be based on user specific parameters. To provide personalized recommendation of content and its availability, a primary content metadata may be determined from amongst the gathered content metadata, based on activity parameters. The primary content metadata may then be rated based on third party ratings, to generate a secondary content metadata. The secondary content metadata, from amongst the rated primary content metadata may then be recommended to the user by the recommending module 116. The recommended secondary content metadata may also include content availability information. The content availability information may convey details regarding where and when the content is available. For example, the content availability information may be recited as 'Watch quiz contest on ABC channel at 8.30 pm'.

Figure 2:
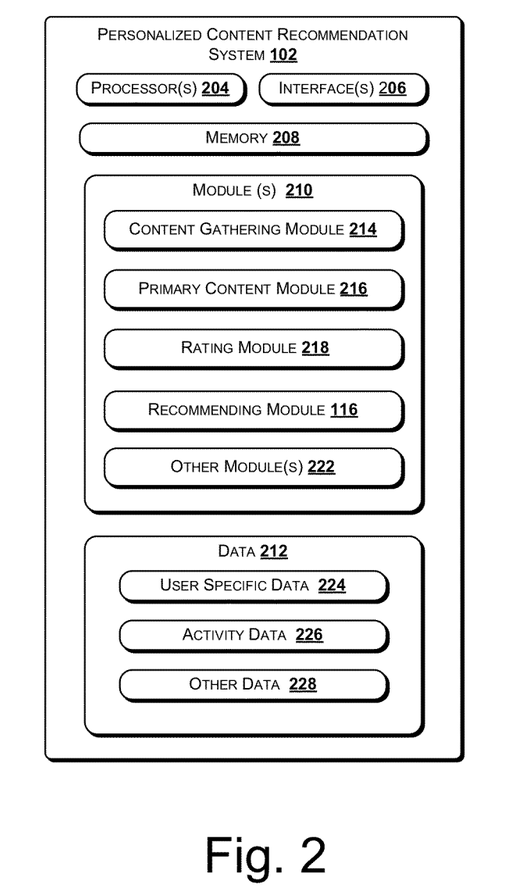
FIG. 2 illustrates components of personalized content recommendation system, in accordance with an embodiment of the present subject matter.

FIG. 2 illustrates exemplary components of the personalized content recommendation system 102, according to an embodiment of the present subject matter. As described earlier, for the sake of explanation, the personalized content recommendation system 102 has been referred to as the system 102 hereinafter. In one implementation, the system 102 includes processor(s) 204, interface(s) 206 and a memory 208. The processor(s) 204 can be a single processing unit or a number of units, all of which could include multiple computing units. The processor(s) 204 may be implemented as one or more microprocessor, microcomputers, digital signal processors, central processing units, state machines, logic circuitries, and/or any devices that manipulate signals based on operational instructions. Among other capabilities the processor(s) 204 are adapted to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 206 may include a variety of software and hardware interfaces, for example, interface for peripheral device(s), such as a keyboard, a mouse, a microphone, an external memory, a speaker, and a printer. Further, the interface(s) 206 may include one or more ports for connecting the system 102 with other computing devices, such as web servers, and external databases. The interface(s) 206 may facilitate multiple communications within a wide variety of protocols and networks, such as a network, including wired networks, e.g., LAN, cable, etc., and wireless networks, e.g., WLAN, cellular, satellite, etc.

The memory 208 may be coupled to the processor 204 and may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes.

The system 102 may also include module(s) 210 and data 212. The modules 210 and the data 212 may be coupled to the processors 204. The modules 210, amongst other things, include routines, programs, objects, components, data structures, etc., which perform particular tasks or implement particular abstract data types. The modules 210 may also be implemented as, signal processor(s), state machine(s), logic circuitries, and/or any other device or component that manipulate signals based on operational instructions.

In another aspect of the present subject matter, the modules 210 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

The module(s) 210 includes, for example, a content gathering module 214, a primary content module 216, a rating module 218, a recommending module 116, and other module(s) 222. The other module(s) 222 include programs that supplement applications or functions performed by a personalized content recommending system, such as system 102. The data 212 serves, amongst other things, as a repository for storing data obtained and processed by one or more module(s) 210. The data 212 includes, for example, user specific data 224, activity data 226 and other data 228. The other data 228 includes data generated as a result of the execution of one or more modules in the other module(s) 222.

According to an implementation of the present subject matter, the content gathering module 214 is configured to gather content metadata from various sources, based on user specific parameters. The user specific parameters can include, but not limited to, demographic data, psychographic data and interests of general users in the user's geographical location. The demographic data may include data from a behavior graph of the people in the location, the people's interests, their likes and dislikes. A user's behavior may be determined through Application Programming Interface(s) (APIs) which may be utilized along with data mining techniques to identify interests, likes and dislikes of users in a region.

As would be appreciated, the gathered content metadata may be source specific where the content metadata defines that which source provides what all content. In other words, content that is available at various sources may be identified while gathering the content metadata based on the user specific parameters. In case the content metadata is associated with movies or television shows, the contents thus gathered based on user specific parameters may be associated with a celebrity and a genre. For example, the content may be a movie and the movie may be associated with a celebrity 'C', such as Jennifer Anniston, Tom Cruise, etc; and genre 'G', such as drama, horror, romance, family, animated, etc. Such gathered content metadata may be converted to content metadata which are specific to the content associated with the content metadata. The content gathering module 214 may also be configured to identify the celebrities and genres from content associated with user specific parameters and gather content metadata based on the celebrities and genres. The content specific content metadata may include various details about the content associated with content metadata, such as its availability at various sources, its posters, description of the content, news relating to the content, etc. The gathered content metadata may be individually stored in user specific data 224.

The content gathering module 214 may be further configured to obtain content availability information for the content associated with gathered content metadata. The content availability information may include details regarding the content such as time, duration, venue of content availability, etc. For example, the content availability information for a movie may share theatres at which the movie is played, timings of playing the movie, contact co-ordinates of the theatre(s), channels which would telecast the movie along with timings and days, sources from which the movie can either be bought or rented, such as Netflix, e-commerce websites, movie stores, etc.

In one implementation of the present subject matter, the primary content module 216 is configured to identify a primary content metadata from the gathered content metadata based on activity parameters associated with the user. The activity parameters can include multiple factors, such as historical viewing data of the user; comments, suggestions, blogs, likes, dislikes and ratings for content from user's friends; and data related to user viewing content on secondary sources.

The primary content module 216 may determine the primary content metadata based on three different sets of content metadata. A first set of primary content metadata may be determined based on the historical viewing data of the user. The historical viewing data can include searches performed, content viewed, content rented, content rated, content purchased, and content explored, by the user in his previous activities. For example, a user may have watched a lot of romantic movies in which many of the actors playing various roles were common. In such a scenario, the primary content module 216 may be configured to determine a first set of primary content metadata that includes romantic movies similar to what the user has watched and, other movies of the actors which are common in the movies watched by the user. Each user activity may be assigned a qualitative score based on value-added by the activity. Table-1 lists the activities that may be performed by the user and corresponding scores for such activities which are indicative of the value addition.

TABLE 1

| Activity | Score |
| --- | --- |
| Chech-in | 1 |
| Rate | 0.5 |
| Favorite | 0.7 |
| Like | 0.4 |
| Tweet | 0.4 |
| Detail View | 0.3 |
| Wish-list | 1 |
| View Trailer | 0.7 |
| Rental | 1 |

The user activities may include activities like check-in and search. Such activities may be regarded as casual activities since they do not add much value addition to the gathering of primary content metadata. Activities like viewing details about the content, rating the content, renting the content may be considered as genuine activities. When all casual activities put together, they may be scored less compared to the genuine activities put together. The genuine activities may be indicative of interest and affinity of the user, associated with the content. The first set may also include other factors, such as viewing format preferred by the user, duration of the content and category of the content such as general, parental, guidance, adult and the like. The user activities may be determined as depicted in table-2.

TABLE 2

| # | Activity | Date | Time | User Id (PMM) | User Id (FB) | User Location | User Zip | Media Title | Media Type | Linear? | Media Quality | Media Rls Date |
| --- | --- | --- | --- | --- | --- | --- | --- | --- | --- | --- | --- | --- |
| 1 | CHECK-IN | 15 Jan. 2013 | 10:00 AM | 1234567a4fr | 1000001 | US | 44143 | Titanic | Movie | Yes | HD | 1997 |
| 2 | CHECK-IN | 16 Jan. 2013 | 11:00 AM | 1234567a4fr | 1000001 | US | 44143 | Spiderman | Movie | Yes | HD | 1998 |
| 3 | CHECK-IN | 17 Jan. 2013 | 12:00 PM | 1234567a4fr | 1000001 | US | 44143 | SkyFall | Movie | Yes | SD | 1999 |
| 4 | RATE | 18 Jan. 2013 | 1:00 PM | 1234567a4fr | 1000001 | US | 44143 | Amour | Movie | Yes | HD | 2000 |
| 5 | RATE | 19 Jan. 2013 | 2:00 PM | 1234567a4fr | 1000001 | US | 44143 | Mama | Movie | Yes | SD | 2001 |
| 6 | RATE | 20 Jan. 2013 | 3:00 PM | 1234567a4fr | 1000001 | US | 44143 | Kill Bill | Movie | Yes | HD | 2002 |
| 7 | FAVORITE | 21 Jan. 2013 | 4:00 PM | 1234567a4fr | 1000001 | US | 44143 | Friends | TV | Yes | HD | 2003 |
| 8 | FAVORITE | 22 Jan. 2013 | 5:00 PM | 1234567a4fr | 1000001 | US | 44143 | Suits | TV | Yes | SD | 2004 |

In said implementation, the primary content module 216 may also determine a second set of primary content metadata based on comments, suggestions, likes and dislikes of friends of the user. For example, the friends of the user may have commented on few contents or may have suggested few contents for viewing. In such scenario, the primary content module 216 may gather primary content metadata based on the suggestions. If the suggested content is common with content in the historical viewing data, the primary content module 216 may gather content metadata associated with similar content. In other words, if the suggestion made by the friends already exists in the first set, the primary content module 216 may gather content metadata related to the celebrity or genre of the suggested content. The likes and dislikes given by the friends may also enhance the primary content module 216 for better content gathering. The primary content module 216 may store the activities of the friends in activity data 226. The activities of the friends may also be scored as listed in table-1. The activities of the friends may indicate to the user the contents viewed by the friends and may be depicted as listed in table-3.

TABLE 3

| # | Activity | Date | Time | User Id (PMM) | User Id (FB) | Friend FB Id | User Location | Friend Zip | Media Title | Media Type | Linear? | Media Quality | Media Rls Date | Media Genre 1 |
| --- | --- | --- | --- | --- | --- | --- | --- | --- | --- | --- | --- | --- | --- | --- |
| 1 | CHECK-IN | 15 Jan. 2013 | 10:00 AM | 1234567a4fr | 1000001 | 1000002 | US | 90301 | Titanic | Movie | Yes | HD | 1997 | Drama |
| 2 | CHECK-IN | 16 Jan. 2013 | 11:00 AM | 1234567a4fr | 1000001 | 1000003 | US | 90301 | Spiderman | Movie | Yes | HD | 1998 | Drama |
| 3 | CHECK-IN | 17 Jan. 2013 | 12:00 PM | 1234567a4fr | 1000001 | 1000003 | US | 90301 | SkyFall | Movie | Yes | SD | 1999 | Horror |
| 4 | RATE | 18 Jan. 2013 | 1:00 PM | 1234567a4fr | 1000001 | 1000003 | US | 90301 | Amour | Movie | Yes | HD | 2000 | Adventure |
| 5 | RATE | 19 Jan. 2013 | 2:00 PM | 1234567a4fr | 1000001 | 1000003 | US | 90301 | Mama | Movie | Yes | SD | 2001 | Romance |
| 6 | RATE | 20 Jan. 2013 | 3:00 PM | 1234567a4fr | 1000001 | 1000003 | US | 90301 | Kill Bill | Movie | Yes | HD | 2002 | Adult |
| 7 | FAVORITE | 21 Jan. 2013 | 4:00 PM | 1234567a4fr | 1000001 | 1000003 | US | 90301 | Friends | TV | Yes | HD | 2003 | Fiction |
| 8 | FAVORITE | 22 Jan. 2013 | 5:00 PM | 1234567a4fr | 1000001 | 1000003 | US | 90301 | Suits | TV | Yes | SD | 2004 | Children |
| 9 | FAVORITE | 23 Jan. 2013 | 6:00 PM | 1234567a4fr | 1000001 | 1000003 | US | 90301 | Arrow | TV | Yes | HD | 2005 | Sci-Fi |

Further, the primary content module 216 may also determine a third set of primary content metadata based on content viewed, accessed, browsed by the user at secondary sources. For example, if the first set of primary content metadata was gathered based on the content viewed by the user on his television through a set top box, the third set of primary content metadata may be obtained through various secondary sources, like websites visited by the user and the audio-visual content viewed, movie trailers viewed by the user at websites like YouTube, news searched by the user through his Smartphone, etc. The activities of the user at the secondary source, Netflix, may be depicted as shown in table-4.

TABLE 4

| # | Date | Time | User Id (PMM) | User Netfix ID | User Location | Media Title | Media Type | Media Quality |
|---|---|---|---|---|---|---|---|---|
| 1 | 15 Jan. 2013 | 10:00 AM | 1234567a4fr | 999999a | US | First Knight | Movie | HD |
| 2 | 16 Jan. 2013 | 11:00 AM | 1234567a4fr | 999999a | US | Blue Lagoon | Movie | HD |
| 3 | 17 Jan. 2013 | 12:00 PM | 1234567a4fr | 999999a | US | Robin Hood | Movie | HD |
| 4 | 18 Jan. 2013 | 1:00 PM | 1234567a4fr | 999999a | US | King Kong | Movie | HD |
| 5 | 19 Jan. 2013 | 2:00 PM | 1234567a4fr | 999999a | US | Snow White | Movie | HD |
| 6 | 20 Jan. 2013 | 3:00 PM | 1234567a4fr | 999999a | US | Far & Away | Movie | HD |
| 7 | 21 Jan. 2013 | 4:00 PM | 1234567a4fr | 999999a | US | First Knight | Movie | HD |
| 8 | 22 Jan. 2013 | 5:00 PM | 1234567a4fr | 999999a | US | Blue Lagoon | Movie | HD |
| 9 | 23 Jan. 2013 | 6:00 PM | 1234567a4fr | 999999a | US | Robin Hood | Movie | HD |

Similarly in another example, the user may have booked movie tickets through an e-portal and may have searched for details regarding entry tickets to a cricket match. While watching the movie, the user may update status in social networking sites as 'watching movie—XYZ'. The user may also comment on the movie, suggest the movie to be watched by other users, may like or dislike the movie by clicking on 'thumbs up' or 'thumbs down' icons respectively, in websites which shares details about the movie. In such case, primary content metadata similar to the movie with regards to celebrity or genre for which the user has booked tickets, or a movie which the user has already viewed and the cricket match to be occurring may be gathered. Hence, the primary content module 216 may be configured to gather primary content metadata based on activity parameters associated with the user.

Every content that the user views, may be segregated into categories, such as general (G), parental guidance suggested (PG), parents strongly cautioned (PG-13), restricted (R) and no-one-17-and-under-admitted (NC-17). When the user views any content, besides gathering the activities, the primary content module 216 may also ascertain a score based on the activity performed and the category to which the content belongs. The scoring of the activity of the user may be as depicted in Table-5(a) and the scoring of the activity of the friends may be as depicted in Table-5(b).

TABLE 5(a)

Count of Media R:  Column Labels

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| General | 1 | 2 | 1 | 2 | 1 | | | | 7 |
| PG-13 | 2 | 1 | 2 | 1 | | 1 | | 1 | 8 |
| R | | | 2 | | 2 | 2 | 2 | 2 | 10 |
| Grand Total | 3 | 3 | 5 | 3 | 3 | 3 | 2 | 3 | 25 |

TABLE 5(b)

Count of Activity  Column Labels

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| General | 3 | 6 | 3 | 6 | 3 | | | | 21 |
| PG-13 | 6 | 3 | 6 | 3 | | 3 | | 3 | 24 |
| R | | | 6 | | 6 | 6 | 6 | 6 | 30 |
| Grand Total | 9 | 9 | 15 | 9 | 9 | 9 | 6 | 9 | 75 |

In one implementation, the activity of the user may also be scored based on the celebrity and genre associated with the content viewed. In order to recommend content which are aligned to the preference and interests of the user, the primary content module 216 may also consider the celebrity scores and the genre scores for the activities of the user. The celebrity score and the genre scores for the user activities may be as depicted in table-6(a) and table-6(b) respectively; and the celebrity score and the genre scores for the friends' activities may be as depicted in table-7(a) and table-7(b) respectively.

TABLE 6(a)

Count of Media Celebs

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| Arnold | | 2 | 2 | | | | | | 4 |
| Catherine Zeta Jones | 1 | | | 1 | | | | 1 | 3 |
| Ed Macmohan | | | | | | | 1 | | 1 |
| Jennifer Anniston | | | | | 1 | 1 | | | 2 |
| Jessica Parkar | | | 1 | | | 1 | | | 2 |
| Julia Robert | | 1 | 1 | | 1 | 1 | | 1 | 5 |
| Kate, Leonardo | 1 | | 1 | | | | | 1 | 3 |
| Michel Douglas | | | | 1 | 1 | | | | 2 |
| Rob Reiner | | | | | | | 1 | | 1 |
| Tom Cruise | 1 | | | 1 | | | | | 2 |
| Grand Total | 3 | 3 | 5 | 3 | 3 | 3 | 2 | 3 | 25 |

TABLE 6(b)

Count of Media Typ

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| Adult | | | | | 1 | 1 | | | 2 |
| Adventure | | | | 1 | 1 | | | | 2 |
| Children | | 2 | 2 | | | | | | 4 |
| Drama | 2 | | 1 | 1 | | | 1 | 1 | 6 |
| Family | | | | | | | 1 | 2 | 3 |
| Fiction | | | 1 | | | 1 | | | 2 |
| Horror | 1 | | | 1 | | | | | 2 |
| Romance | | | | | 1 | 1 | | | 2 |
| Sci-Fi | | 1 | 1 | | | | | | 2 |
| Grand Total | 3 | 3 | 5 | 3 | 3 | 3 | 2 | 3 | 25 |

TABLE 7(a)

Count of Activity

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| Arnold | | 6 | 6 | | | | | | 12 |
| Catherine Zeta Jones | 3 | | | 3 | | | | 3 | 9 |
| Ed Macmohan | | | | | | | 3 | | 3 |
| Jennifer Anniston | | | | | 3 | 3 | | | 6 |
| Jessica Parkar | | | 3 | | | 3 | | | 6 |
| Julia Robert | | 3 | 3 | | 3 | 3 | | 3 | 15 |
| Kate, Leonardo | 3 | | 3 | | | | | 3 | 9 |
| Michel Douglas | | | | 3 | 3 | | | | 6 |
| Rob Reiner | | | | | | | 3 | | 3 |
| Tom Cruise | 3 | | | 3 | | | | | 6 |
| Grand Total | 9 | 9 | 15 | 9 | 9 | 9 | 6 | 9 | 75 |

TABLE 7(b)

Count of Activity

| Row Labels | CHECK-IN | DETAIL VIEW | FAVORITE | FB-LIKE | RATE | TWEET | VIEW-TRAILER | WISHLIST | Grand Total |
|---|---|---|---|---|---|---|---|---|---|
| Adult | | | | | 3 | 3 | | | 6 |
| Adventure | | | | 3 | 3 | | | | 6 |
| Children | | 6 | 6 | | | | | | 12 |
| Drama | 6 | | 3 | 3 | | | 3 | 3 | 18 |
| Family | | | | | | | 3 | 6 | 9 |
| Fiction | | | 3 | | | 3 | | | 6 |

TABLE 7(b)-continued

| Count of Activity | Column Labels | | | | | | | | |
|---|---|---|---|---|---|---|---|---|---|
| Row Labels | CHECK-IN | DETAIL VIEW | FAVORITE | FB-LIKE | RATE | TWEET | VIEW-TRAILER | WISHLIST | Grand Total |
| Horror | 3 | | | 3 | | | | | 6 |
| Romance | | | | | 3 | 3 | | | 6 |
| Sci-Fi | | 3 | 3 | | | | | | 6 |
| Grand Total | 9 | 9 | 15 | 9 | 9 | 9 | 6 | 9 | 75 |

In one implementation, the primary content module 216 may determine a combination of all the content gathered through the first, second, and third set of primary content metadata; scoring of the activities of the user; and the category or genre with high score, to identify a set of primary content metadata representing content to be recommended to the user associated with his interest and liking. In an implementation, the primary content module 216 may be further configured to identify presence of a particular primary content metadata in more than one set. If there exists a primary content metadata present in more than one set, such primary content metadata may be scored with a high value or may be regarded as important to be recommended, as compared to other content identified. The primary content module 216 may also store details of the secondary sources, history of searches and activities of user in the activity data 226.

When the primary content module 216 has determined a final set of primary content metadata associated with a set of contents gathered based on the scores of activity associated with celebrity and genre, the content gathering module 214 may check for the availability of these contents on various sources, such as the television in next 7 days. The content gathering module 214 may be configured to obtain a choice of number of days from the user to check for the content availability for those days. For example, the content availability information for the final set of primary content metadata may indicate the timings and channels for each of the content which may be aired on the next 7 days. In case where the user selects the number of days such as next 4 days, etc., the content availability information for the telecast of the content for such number of days may be obtained. When a particular content, not falling under the categories of movies or television shows, the content gathering module 214 may identify other sources where the content may be available. In case the content is a theatrical show or a drama, the content gathering module 214 may be obtain venue information, timings, description, etc for the same drama or for other dramas.

In another implementation of the present subject matter, the rating module 218 is configured to generate a statistical profile of the user based on the user's likes and dislikes. The user's likes and dislikes may be determined based on user's activity parameters. The statistical profiling may be based on user preferences and interests. The user interests may also be ascertained by explicit method or implicit method. The explicit method of ascertaining user interests may include a set of questions to the user. The questions may be constructed in way to extract the user preferences. Such explicit ascertaining may be performed for a new user or for a user without any background information. From the answers to the questions, preferences of the user may be studied. Implicit method of ascertaining user preferences may be performed while the user searches for content on various different sources. The statistical profiling may provide with a unified view of the user's interest based on his past activities. It would be understood that the statistical profiling may allow accountability for modifications in user's likes and dislikes from time to time which may also change over a period of time. In said implementation, the primary content module 216 may be further configured to utilize the statistical profiling of the user, generated by the rating module 218, to determine the set of primary content metadata from amongst the three sets of identified content metadata.

According to an implementation of the present subject matter, the rating module 218 is configured to rate the primary content metadata gathered in the three sets based on content rating parameter, the scoring of the user activities and the scoring of the friends' activities. The rating module 218 can be configured to obtain ratings for the content associated with the primary content metadata, from available rating sources and third parties, including the sources 106. The content rating parameter may include rating from third party source, such as IMDb®, Rotten Tomatoes™, Tomatometer™, Flixter™, and Netflix®; and ratings given by the friends of the user. The rating module 218 may rate the primary content metadata and the scoring list based on ratings obtained from source(s) 106 or based on ratings obtained from third party source or rating given by the friends or combination of ratings to generate a consolidated rating for the content represented by the set of primary content metadata. The rated final set of primary content metadata may be obtained as two individual sets based on celebrity and scoring and may be as depicted in table-8(a) and table-8(b) respectively.

TABLE 8(a)

| Row Labels | Sum of Net Score (FB adjust) |
|---|---|
| Arnold | 8 |
| Brook Shield | 11 |
| Catherine Zeta Jones | 6.6 |
| Ed Macmohan | 2.8 |
| Jennifer Anniston | 3.6 |
| Jessica Parkar | 4.4 |
| Julia Robert | 8.6 |
| Kate, Leonardo | 7.8 |
| Kevin Costner | 12 |
| Kristen Stewart | 1 |
| Michel Douglas | 3.6 |
| Naomi Watts | 8 |
| Nicole Kidman | 1 |
| Rob Reiner | 2.8 |
| Sean Connery | 6 |
| Tom Cruise | 6.6 |
| Grand Total | 93.8 |

TABLE 8(b)

| Row Labels | Sum of Net Score |
|---|---|
| Adult | 14.5 |
| Adventure | 3.6 |
| Children | 16 |
| Documentary | 2 |
| Drama | 21.2 |
| Family | 21.8 |
| Fiction | 4.4 |
| History | 4 |
| Horror | 7.6 |
| Period Piece | 2 |

TABLE 8(b)-continued

| Row Labels | Sum of Net Score |
|---|---|
| Romance | 44.6 |
| Sci-Fi | 4 |
| Grand Total | 145.7 |

The recommending module 116 may generate a set of secondary content metadata based on the final set of rated primary content metadata. The secondary content metadata may include primary content metadata with high ratings. The recommending module 116 is further configured to provide the content availability information of the content represented by the secondary content metadata. For example, the primary content module 216 may determine 4 different contents to be recommended to a user based on activity parameters associated with the user and his available statistical profile. The rating module 218 may then rate the 4 content based on content rating parameters where the rating of such contents is a combination of ratings available from third party sources, such as IMDb®, Rotten Tomatoes™, Tomatometer™, Flixter™, and Netflix®. In such a scenario, if from amongst the 4 contents, the aggregate rating of only 3 contents is identified to be above a pre-defined threshold, the identified 3 contents may be identified as a secondary content metadata. The secondary content metadata may then be provided to the user as a recommendation along with the availability of the content associated with the secondary content metadata. In one implementation, the recommended set of secondary content metadata may be depicted as in table-9 below. It will be appreciated that the table-9 is just a representation of the recommendation and shall not be treated as the exact recommendation provided. It may be understood by a person skilled in the art that the recommendation may include various colorful posters and pictures to illustrate or depict the recommended content.

of the user for channel B may initiate the user device 104 to act as a remote control and may cause the STB 112 to switch to channel B. According to an implementation of the present subject matter, the switching of the secondary content metadata onto a TV 114 is performed through the set-top box (STB) 112. The user device 104 may provide a channel switch request to the STB 112 such that the user may view the selected content on channel B.

According to implementation of the present subject matter, the recommending module 116 is still further configured to provide a mash-up option and a second screen view in the user device 104. Based on the secondary content metadata which the user clicks as his preference, the mash-up option enables the user to view, but not limited to, promos, profile of an actor, photo gallery and ratings associated with the preference. The second screen view is provided to the user to view comments from the friends on a social networking page or a celebrity fan page. The second screen view may also enable the user to post his comments and ratings while watching the content telecast on the TV 114.

Figure 3A:
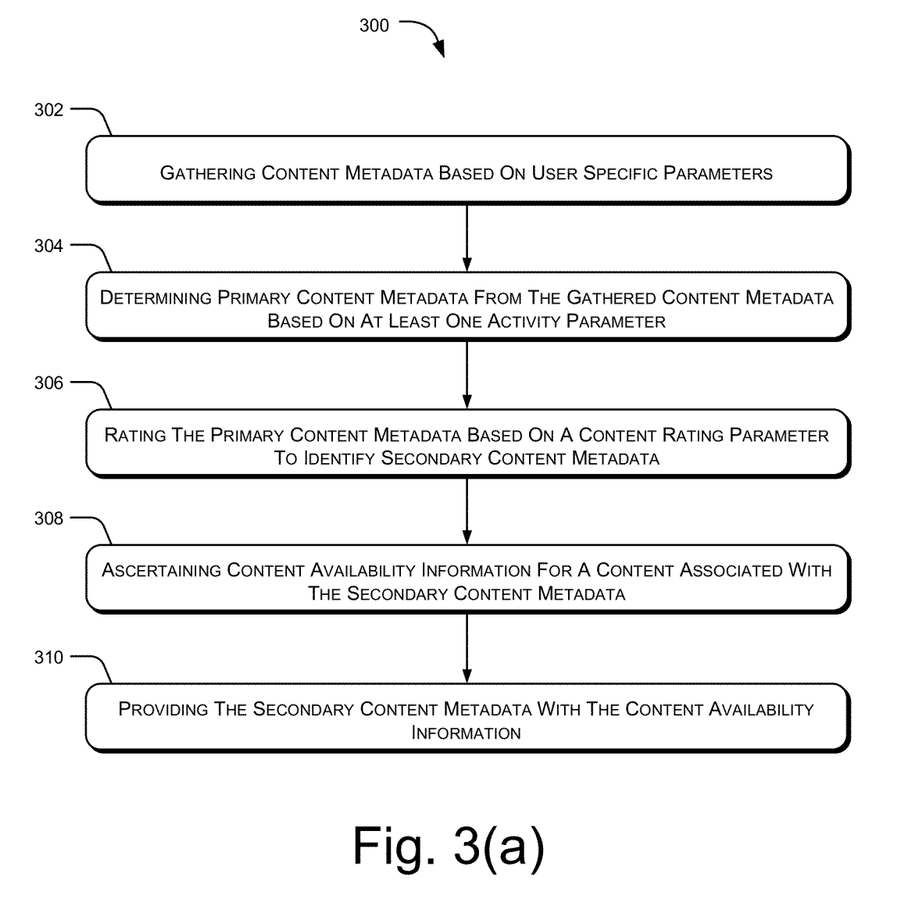
FIG. 3(a) illustrates a method for personalized content recommendation, in accordance with an embodiment of the present subject matter.
Figure 3B:
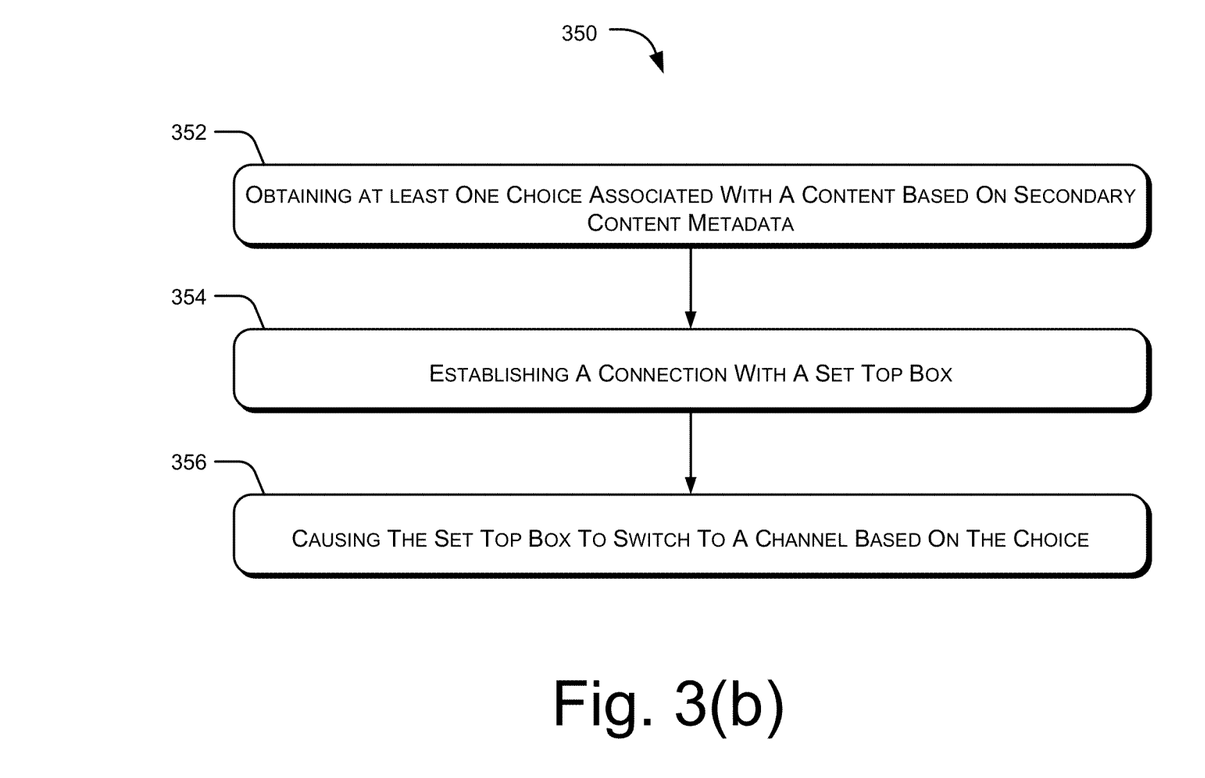
FIG. 3(b) illustrates a method for viewing the recommended personalized content, in accordance with an embodiment of the present subject matter.

FIG. 3(a) and FIG. 3(b) illustrate methods 300 and 350 respectively for personalized content recommendation, in accordance with an embodiment of the present subject matter. According to an aspect, the concept of personalized content recommendation are described with reference to the personalized content recommendation system 102 described above.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instruc-

TABLE 9

| # | Country | Zipcode | Service Provider Name | Service Provider ID | Network | Call Letter | Channel | Date | Airing Time | Content Type | Format | Rating | Title |
|---|---|---|---|---|---|---|---|---|---|---|---|---|---|
| 1 | US | 44143 | Comcast-HD | 61614 | HBO | HBO1 | 123 | 1 Jan. 2013 | 12:00 PM-2:30 PM | Movie | HD | General | Erased |
| 2 | US | 44143 | Comcast-HD | 61614 | HBO | HBO2 | 456 | 2 Jan. 2013 | 2:30 PM-4:00 PM | Movie | HD | General | Titanic |
| 3 | US | 44143 | Comcast-HD | 61614 | HBO | HBO3 | 666 | 3 Jan. 2013 | 7:00 PM-9:30 PM | Movie | SD | PG-13 | Spiderman |
| 4 | US | 44143 | Comcast-HD | 61614 | HBO | HBO4 | 777 | 4 Jan. 2013 | 9:00 PM-11:00 PM | Movie | HD | R | Safe Heaven |
| 5 | US | 44143 | Comcast-HD | 61614 | HBO | HBO5 | 888 | 5 Jan. 2013 | 1:00 AM-3:20 AM | Movie | HD | General | Starbuck |
| 6 | US | 44143 | Comcast-HD | 61614 | HBO | HBO6 | 234 | 6 Jan. 2013 | 12:00 PM-2:30 PM | Movie | HD | PG-13 | The Host |
| 7 | US | 44143 | Comcast-HD | 61614 | HBO | HBO1 | 123 | 7 Jan. 2013 | 2:30 PM-4:00 PM | Movie | SD | General | Temptation |
| 8 | US | 44143 | Comcast-HD | 61614 | HBO | HBO2 | 456 | 8 Jan. 2013 | 7:00 PM-9:30 PM | Movie | HD | PG-13 | Identity Thief |

In one implementation of the present subject matter, from amongst the recommendations provided to the user based on the secondary content metadata on the user device 104, the user may decide to access a content by selecting the content from amongst the recommendations. The selection may provide the user with access options based on the availability, for the user to choose from. For example, if the content which the user wishes to access is a movie which is available at multiple sources, such as YouTube, Netflix, Channel A, Channel B, and in a multiplex nearby, the options may be provided by the user to choose from. The user may choose to watch the movie at the multiplex and may select the option of multiplex. In such situations, the recommendation module 116 may redirect the user to the portal of the multiplex to allow the user to book a ticket based on his choice of time. It may also happen that the user may choose the watch the movie at channel B on his TV, such as the TV 114. In such a situation, the selection tions may be located in both local and remote computer storage media, including memory storage devices.

The order in which the method is described is not intended to be construed as a limitation, and any number of the described method blocks can be combined in any order to implement the methods 300 and 350, or an alternative method. Additionally, individual blocks may be deleted from the methods without departing from the spirit and scope of the subject matter described herein. Furthermore, the methods 300 and 350 can be implemented in any suitable hardware, software, firmware, or combination thereof. The methods 300 and 350 is explained with reference to the personalized content recommendation system 102, however, it will be understood that the methods can be implemented in other systems as well.

Referring to method 300, at block 302, content metadata are gathered based on user specific parameters. The user specific parameters may include demographic data, psychographic data and interests of other users in the user's geographical location. The demographic data may include data from a behavior graph of the people in the location, the people's interests, their likes and dislikes.

At block 304, a primary content metadata is determined from amongst the gathered content metadata, based on at least one activity parameter. The activity parameters may include multiple factors, such as historical viewing data of the user; comments, suggestions, blogs, likes, dislikes and ratings for content from user's friends; and data related to user viewing content on secondary sources. The primary content metadata may be determined based on one of the activity parameters or a combination of parameters.

At block 306, the primary content metadata is rated based on a content rating parameter to identify a secondary content metadata. The content rating parameter may include rating from third party source and ratings given by the friends of the user. The primary content metadata may be rated based on individual consideration of content rating parameters or may be based on combination of content rating parameters and at least one of the activity parameters.

At block 308, content availability information for content associated with a secondary content metadata is ascertained. The secondary content metadata may be determined based on the ratings of the primary content metadata. The content availability information may include details related to the content such as, when and where the content is available.

At block 310, the secondary content metadata along with the content availability information is provided to the user in the user device.

Referring to FIG. 3(*b*), the method 350, at block 352 at least one choice of the user, associated to access a content is obtained. The choice made by the user may be based on the provided recommendation to the user through the secondary content metadata.

At block 354, the user device establishes a connection with a set top box. The connection may be obtained through pairing the set top box to the user device. Once the user device and the set top box are connected with each other, the user may be able to control the set top box from the user device. The connection may enable efficient transfer of data. Besides receiving data from the user device, the set top box also receives television channel broadcasting data from a satellite television tower.

At block 356, the user device causes the set top box to switch to a channel based on selection of associated content. The switching is enabled based content availability information of the content associated with the secondary content metadata.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, (for example, a memory), and executes those instructions, thereby performing one or more method(s), including one or more of the method(s) described herein. Such instructions may be stored and/or transmitted using any of a variety of known computer-readable media.

Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method for generating personalized content recommendation and content availability to a user, the method comprising:

gathering, dynamically, by a processor, content metadata from a plurality of sources based on user specific parameters, wherein the content metadata is associated with a content;

classifying, by the processor, each activity of the user as one of a casual activity of a plurality of casual activities and a genuine activity of a plurality of genuine activities, wherein the casual activity is considerably less significant for gathering a primary content metadata, and wherein the genuine activity is considerably significant for gathering the primary content metadata;

determining, by the processor, from amongst the gathered content metadata, the primary content metadata associated with the genuine activities and casual activities, wherein the genuine activities are indicative of interest and affinity the user has for the content;

rating, by the processor, the primary content metadata based on content rating parameters to generate a secondary content metadata, wherein the content rating parameters comprise ratings provided to the content by third party sources, ratings provided to the content by user's friends, implicit user preferences, and a score dynamically assigned to each activity of the user;

determining, by the processor, the secondary content metadata based on the rated primary content metadata, wherein the secondary content metadata comprises highest rated primary content metadata;

ascertaining, by the processor, content availability information for content associated with the secondary content metadata, wherein the content availability information comprises details related to when and where the content is available; and providing, by the processor, the secondary content metadata with the content availability information to the user on a user device.

2. The method as claimed in claim 1, wherein the user specific parameters comprise demographic data for the user, psychographic data for the user, and interests of each user in a geographical location of the user.

3. The method as claimed in claim 1, wherein the primary content metadata is determined from amongst the gathered content metadata based on an activity parameter, and wherein the activity parameter comprises user's historical viewing of contents, comments and suggestions made by user's friends on the contents, and details of user viewed contents at secondary sources.

4. The method as claimed in claim 1, wherein the secondary content metadata is associated with at least one celebrity and at least one genre present in the user's historical viewing data.

5. A personalized content recommendation system comprising:

a processor;

a content gathering module coupled to and implemented by the processor to dynamically gather content metadata from a plurality of sources based on user specific parameters, wherein the content metadata is associated with a content;

a primary content module coupled to and implemented by the processor to:

classify each activity of the user as one of a casual activity of a plurality of casual activities and a genuine activity of a plurality of genuine activities, wherein the casual activity is considerably less significant for gathering a primary content metadata, and wherein the genuine activity is considerably significant for gathering the primary content metadata; and determine, from amongst the gathered content metadata, the primary content metadata associated with the genuine activities and casual activities, wherein the genuine activities are indicative of interest and affinity the user has for the content;

a rating module coupled to and implemented by the processor to rate the primary content metadata based on content rating parameters to generate a secondary content metadata, wherein the content rating parameters comprise ratings provided to the content by third party sources, ratings provided to the content by user's friends, implicit user preferences, and a score dynamically assigned to each activity of the user; and a recommending module coupled to and implemented by the processor to:
   determine, by the processor, the secondary content metadata based on the rated primary content metadata, wherein the secondary content metadata comprises highest rated primary content metadata;
   ascertain content availability information for content associated with the secondary content metadata, wherein the content availability information comprises details related to when and where the content is available; and
   provide the secondary content metadata with the content availability information to the user.

6. The personalized content recommendation system as claimed in claim 5, wherein the user specific parameters comprise demographic data for the user, psychographic data for the user, and interests of each user in a geographical location of the user.

7. The personalized content recommendation system as claimed in claim 5, wherein the user's interest and affinity for the content are determined by one of, explicit method and implicit method, and wherein the explicit method comprises a set of questions to the user for extracting user's interests and the implicit method comprises extracting user's interests while the user searches for contents on secondary sources.

8. The personalized content recommendation system as claimed in claim 5, wherein the primary content metadata is determined from amongst the gathered content metadata based on an activity parameter, and wherein the activity parameter comprises user's historical viewing of contents, comments and suggestions made by user's friends on the contents, and details of user viewed contents at secondary sources.

9. A non-transitory computer readable medium having a set of computer readable instructions that, when executed, cause a computing system to:
   gather, dynamically, content metadata from a plurality of sources based on user specific parameters, wherein the content metadata is associated with a content;
   classify each activity of the user as one of a casual activity of a plurality of casual activities and a genuine activity of a plurality of genuine activities, wherein the casual activity is considerably less significant for gathering a primary content metadata, and wherein the genuine activity is considerably significant for gathering the primary content metadata;
   determine from amongst the gathered content metadata, the primary content metadata associated with the genuine activities and casual activities, wherein the genuine activities are indicative of interest and affinity the user has for the content;
   rate the primary content metadata based on content rating parameters to generate a secondary content metadata, wherein the content rating parameters comprise ratings provided to the content by third party sources, ratings provided to the content by user's friends, implicit user preferences, and score dynamically assigned to each activity of the user;
   determine the secondary content metadata based on the rated primary content metadata, wherein the secondary content metadata comprises highest rated primary content metadata;
   ascertain content availability information for content associated with the secondary content metadata, wherein the content availability information comprises details related to when and where the content is available; and
   provide the secondary content metadata with the content availability information to the user on a user device.

* * * * *